United States Patent
Nozawa

(10) Patent No.: US 10,645,152 B2
(45) Date of Patent: May 5, 2020

(54) INFORMATION PROCESSING APPARATUS AND MEMORY CONTROL METHOD FOR MANAGING CONNECTIONS WITH OTHER INFORMATION PROCESSING APPARATUSES

(71) Applicant: FUJITSU LIMITED, Kawasaki-shi, Kanagawa (JP)

(72) Inventor: Yasubumi Nozawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 67 days.

(21) Appl. No.: 15/991,312

(22) Filed: May 29, 2018

(65) Prior Publication Data

US 2018/0375927 A1  Dec. 27, 2018

(30) Foreign Application Priority Data

Jun. 21, 2017  (JP) .................. 2017-121571

(51) Int. Cl.
*H04L 29/08* (2006.01)
*H04L 12/26* (2006.01)
*G06F 16/182* (2019.01)

(52) U.S. Cl.
CPC ........ *H04L 67/1002* (2013.01); *G06F 16/182* (2019.01); *H04L 43/0876* (2013.01); *H04L 43/16* (2013.01); *H04L 67/10* (2013.01); *H04L 67/1097* (2013.01); *H04L 67/143* (2013.01)

(58) Field of Classification Search
CPC ... G06F 16/182; H04L 43/0876; H04L 43/16; H04L 67/1002; H04L 67/143
See application file for complete search history.

(56) References Cited

U.S. PATENT DOCUMENTS

| | | | |
|---|---|---|---|
| 6,105,067 A | 8/2000 | Batra | |
| 6,996,615 B1 * | 2/2006 | McGuire | G06F 9/505 709/224 |
| 7,287,082 B1 * | 10/2007 | O'Toole, Jr. | H04L 67/1008 709/223 |
| 7,990,847 B1 * | 8/2011 | Leroy | H04L 43/0817 370/216 |
| 10,560,314 B2 * | 2/2020 | Ramachandran | H04L 43/0817 |
| 2004/0184070 A1 * | 9/2004 | Kiraly | G06F 3/1205 358/1.15 |

(Continued)

FOREIGN PATENT DOCUMENTS

| | | |
|---|---|---|
| JP | 2000-029814 | 1/2000 |
| JP | 2007-226398 | 9/2007 |
| JP | 2009-181481 | 8/2009 |

*Primary Examiner* — Mohamed A. Wasel
(74) *Attorney, Agent, or Firm* — Fujitsu Patent Center

(57) ABSTRACT

A communication interface is capable of adding a connection in response to a request from another information processing apparatus. A memory stores connection information indicating the number of connections being maintained and timing at which communication was last performed for each of the maintained connections. When an increase in the number of maintained connections per unit time exceeds a first threshold and the number of maintained connections also exceeds a second threshold, a processor selects, based on the connection information, at least one connection out of the maintained connections in order from oldest timing, and cuts off the selected at least one connection.

5 Claims, 11 Drawing Sheets

(56) References Cited

U.S. PATENT DOCUMENTS

| | | | |
|---|---|---|---|
| 2006/0274370 A1* | 12/2006 | Shima | G06F 3/1204 358/1.15 |
| 2007/0198684 A1 | 8/2007 | Mizushima | |
| 2012/0131093 A1* | 5/2012 | Hamano | G06F 9/5088 709/203 |
| 2012/0221771 A1* | 8/2012 | Yoon | G06F 12/0246 711/103 |
| 2014/0056313 A1* | 2/2014 | Wada | H04L 63/02 370/463 |
| 2016/0165663 A1* | 6/2016 | Shanmugam | H04W 76/10 370/338 |
| 2016/0269491 A1* | 9/2016 | Eom | G06T 11/001 |
| 2017/0171410 A1* | 6/2017 | Harada | H04N 1/00891 |

\* cited by examiner

FIG. 6

CONNECTION NUMBER TABLE ─ 132

| | |
|---|---|
| PRESENT NUMBER OF CONNECTIONS | 5050 |
| PREVIOUS NUMBER OF CONNECTIONS | 4900 |
| RATE OF INCREASE | 150 |
| RATE OF INCREASE THRESHOLD | 100 |
| TOTAL NUMBER THRESHOLD | 5000 |
| NUMBER OF EXCESS CONNECTIONS | 50 |

INFORMATION PROCESSING APPARATUS AND MEMORY CONTROL METHOD FOR MANAGING CONNECTIONS WITH OTHER INFORMATION PROCESSING APPARATUSES

CROSS-REFERENCE TO RELATED APPLICATION

This application is based upon and claims the benefit of priority of the prior Japanese Patent Application No. 2017-121571, filed on Jun. 21, 2017, the entire contents of which are incorporated herein by reference.

FIELD

The embodiments discussed herein are related to an information processing apparatus and a memory control method.

BACKGROUND

When two information processing apparatuses communicate via a network, a TCP (Transmission Control Protocol) connection or the like is established between the two information processing apparatuses. When one information processing apparatus is capable of communicating with a plurality of other information processing apparatuses, the information processing apparatus may simultaneously maintain a plurality of connections. As one example, one information processing apparatus receives connection establishment requests from each of a plurality of other information processing apparatuses and establishes new connections in accordance with the received connection establishment requests so that a plurality of connections are maintained between the information processing apparatus and the plurality of other information processing apparatuses.

When a new connection has been established, a memory region including a reception buffer or the like that temporarily holds data received from the peer apparatus is assigned to the new connection. An information processing apparatus that maintains a plurality of connections may clean up old connections based on the passage of time, such as by cutting off old connections that have not been cut off even though a predetermined period has passed from when communication was last performed.

As one example, a Web system that manages connections between an application server and a data server has been proposed. The proposed Web server establishes a plurality of connections between the application server and the data server in advance and places the connections in a connection pool. The Web server dynamically assigns connections to servlets running on the application server. Out of the connections assigned to servlets, the Web server cancels the assignment of connections that have remained in an unused state for a predetermined time.

A computer system where an application server connects to a plurality of database servers has also been proposed. The proposed computer system establishes a plurality of connections, places the connections in a connection pool, and assigns an identifier, which identifies a database server to be connected, to each connection. On detecting a failure on a connection, the computer system deletes the connections to which the same identifier is assigned as the connection on which the failure was detected from the connection pool.

A computer system that controls the number of connections to be maintained between a service user apparatus and a service provider apparatus has also been proposed. The proposed computer system establishes a plurality of connections in advance between the server user apparatus and the server provider apparatus. The computer system monitors the load of the service provider apparatus and when the load has increased, reduces the number of connections that the service user apparatus is able to use.

See, for example, the following documents:

Japanese Laid-open Patent Publication No. 2000-29814;
Japanese Laid-open Patent Publication No. 2007-226398; and
Japanese Laid-open Patent Publication No. 2009-181481.

However, during parallel processing where a program is executed by a plurality of nodes in parallel, a data transfer phase where the plurality of nodes communicate with a specified information processing apparatus at the same time may occur. One example is when a plurality of nodes each perform a so-called "stagein" that copies input data from a specified information processing apparatus, such as a data server, into a local storage apparatus before a program is launched. After the program has ended, the plurality of nodes may each perform a so-called "stageout" that transfers output data from a local storage apparatus to a specified information processing apparatus, such as a data server. In a data transfer phase, a plurality of new connections may be established in a short time between a specified information processing apparatus and a plurality of nodes.

However, when a data transfer phase of parallel processing occurs in a state where a comparatively large number of connections are already being maintained by an information processing apparatus, there is a risk of insufficient memory regions, which may result in nodes not being able to quickly establish new connections and start transferring data. In this situation, there is also the risk that simply waiting for existing connections to be disconnected in keeping with normal disconnection protocols will delay the completion of the data transfer phase and in turn the completion of parallel processing.

SUMMARY

According to one aspect, there is provided an information processing apparatus including: a communication interface capable of adding a connection in response to a request from another information processing apparatus; a memory that stores connection information indicating a number of connections being maintained and timing at which communication was last performed for each of the maintained connections; and a processor that selects, when an increase in the number of maintained connections per unit time exceeds a first threshold and the number of maintained connections also exceeds a second threshold, at least one connection out of the maintained connections in order from oldest timing, based on the connection information, and cuts off the selected at least one connection.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 depicts one example of a connection number table;

DESCRIPTION OF EMBODIMENTS

Figure 1:
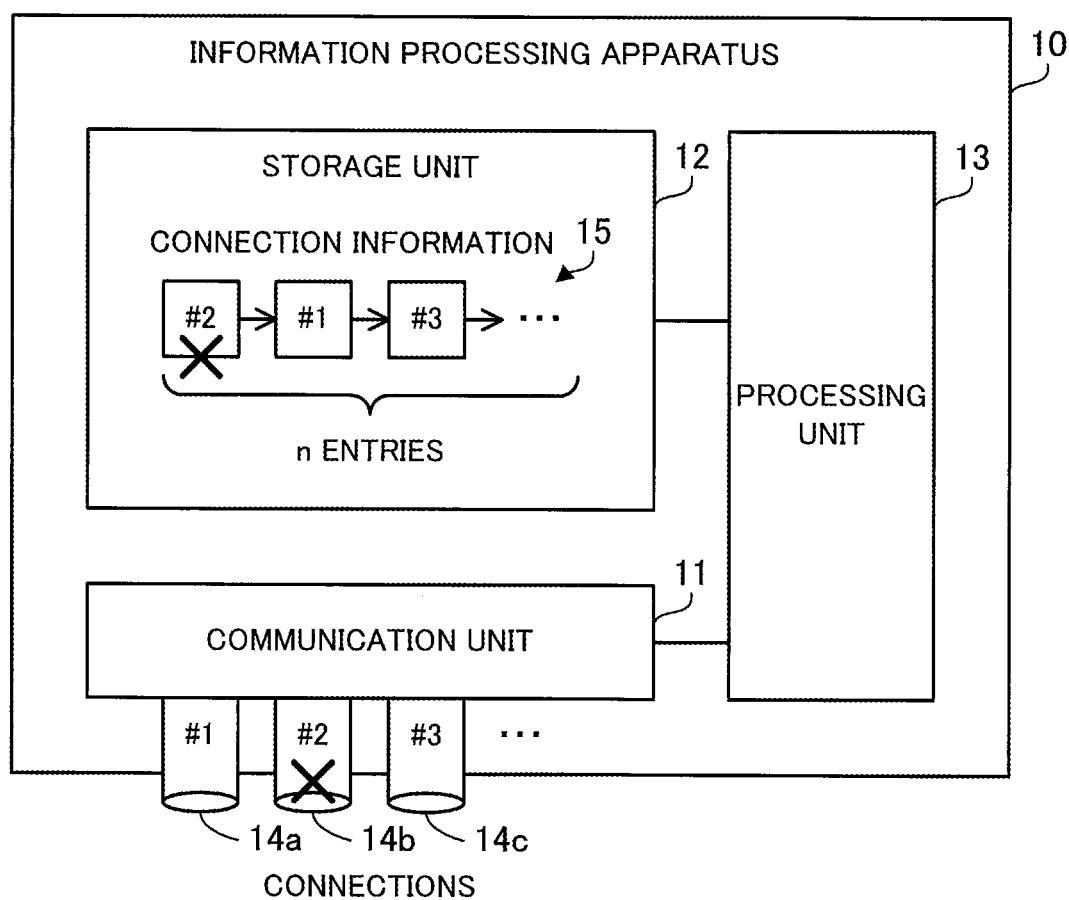
FIG. 1 depicts an information processing apparatus according to a first embodiment.

Several embodiments will be described below with reference to the accompanying drawings, wherein like reference numerals refer to like elements throughout.

First Embodiment

A first embodiment will now be described. FIG. 1 depicts an information processing apparatus according to the first embodiment.

An information processing apparatus 10 according to the first embodiment communicates via a network with other information processing apparatuses. The information processing apparatus 10 may be a server computer, or may be a data server that manages data used by another information processing apparatus. As one example, the information processing apparatus 10 is used in a parallel processing system including a plurality of nodes that execute programs in parallel.

The information processing apparatus 10 includes a communication unit 11, a storage unit 12, and a processing unit 13.

The communication unit 11 may be a wired communication interface connected to a wired communication apparatus, such as a router or a switch, or may be a wireless communication interface connected to a wireless communication apparatus, such as a base station or an access point. The storage unit 12 may be a volatile semiconductor memory, such as RAM (Random Access Memory), or may be nonvolatile storage, such as an HDD (Hard Disk Drive) or flash memory. As one example, the processing unit 13 is a processor such as a CPU (Central Processing Unit) or a DSP (Digital Signal Processor). However, the processing unit 13 may include application-specific electronic circuitry, such as an ASIC (Application Specific Integrated Circuit) or an FPGA (Field Programmable Gate Array). The processor executes programs stored in a memory, such as RAM, which may be the storage unit 12. In this specification, a group including a plurality of processors is referred to as a "multi-processor" or simply as a "processor".

The communication unit 11 is capable of establishing connections in response to requests from other information processing apparatuses. As examples, a "connection" is a TCP connection on a LAN (Local Area Network) or a connection on InfiniBand. As one example, the communication unit 11 establishes a connection via two or more messages in accordance with a predetermined procedure defined by a protocol. The communication unit 11 is capable of highly reliable data communication with another information processing apparatus using the established connection. As one example, the communication unit 11 receives a data read request on a given connection and sends the requested data in reply on the same connection. As another example, the communication unit 11 receives a data write request on a given connection and sends a write result in reply on the same connection.

The information processing apparatus 10 is capable of simultaneously maintaining a plurality of connections and is also capable of maintaining connections with a plurality of other information processing apparatuses. As one example, the information processing apparatus 10 may establish a plurality of connections in keeping with requests from a plurality of nodes included in a parallel processing system and simultaneously maintain the plurality of connections. The information processing apparatus 10 consumes a memory region, such as a RAM region, for each of the maintained connections. As one example, for each of the maintained connections, the information processing apparatus 10 prepares a reception buffer that temporarily holds messages received by the communication unit 11 and a transmission buffer that temporarily holds messages transmitted by the communication unit 11.

The larger the number of maintained connections, the greater the amount of consumed memory in the information processing apparatus 10. The number of connections that the information processing apparatus 10 is capable of maintaining depends on the total amount of memory regions in the information processing apparatus 10. As one example, when the communication unit 11 has received a connection establishment request from another information processing apparatus but it is not possible to reserve a memory region corresponding to the new connection, the establishment of the new connection may fail. When this happens, the communication unit 11 may transmit an error message in reply to the other information processing apparatus.

There are also cases where established connections are cut off. As one example, the communication unit 11 cuts off a connection by exchanging two or more messages via a predetermined procedure defined by a protocol. The cutting off of a connection may be executed in response to a request from another information processing apparatus or may be executed according to a judgment by the information processing apparatus 10. As one example, out of the maintained connections, the information processing apparatus 10 may cut off a connection for which a predetermined time (for example, around several tens of minutes) has passed since data communication was last performed, which is to say, a connection for which an idle period has exceeded a threshold. When a connection is cut off, the information processing apparatus 10 is capable of releasing the memory region corresponding to the connection that was cut off.

The storage unit 12 stores connection information 15. The connection information 15 indicates connections being maintained by the information processing apparatus 10 and usage states of the respective connections. The connection information 15 may be used to specify the number of connections being maintained. The connection information 15 may also be used to specify the timing at which data communication was last performed on each of the maintained connections. As one example, the connection information 15 may include a connection list in which identification information on the maintained connections is arranged in order of the oldest timing at which data communication was last performed. The connection information 15 may further include connection number information indicating the present number of connections. However, it is also possible to count the number of connections being maintained using the connection list described above.

The information processing apparatus 10 monitors how many connections are being added and a communication state of each connection and continuously updates the connection information 15. As one example, when a connection has been added, the information processing apparatus 10 adds identification information for the added connection to the end of the connection list. Also, as one example, when data communication has been performed on a given connection, the information processing apparatus 10 moves the identification information on the connection in question to the end of the connection list. With this configuration, the connection indicated by the identification information at the front of the connection list is the connection with the oldest timing at which data communication was last performed, that is, the connection with the longest idle time.

The processing unit 13 refers to the connection information 15 stored in the storage unit and determines the timing for cutting off connections and which connections are to be cut off. Here, the processing unit 13 calculates the number of connections that have been added per unit time (for example, per second) and determines whether the calculated number of added connections exceeds a first threshold (for example, around several hundred). The processing unit 13 determines whether the total number of connections being maintained exceeds a second threshold (for example, around several thousands to several tens of thousands of connections). When both the number of connections added per unit time exceeds the first threshold and the total number of connections exceeds the second threshold, the processing unit 13 decides to cut off existing connections as soon as possible to eliminate the insufficiency of memory regions.

The number of connections added per unit time exceeding the first threshold, that is, a sudden increase in the number of connections, may occur when a plurality of nodes included in a parallel processing system execute a data transfer phase. In a data transfer phase, the plurality of nodes used to execute a job transmit or receive data at the same time during the job. The data transfer phase may include a "stageout" where a plurality of nodes that have been used to execute a program then save result data at the same time in the information processing apparatus 10. The data transfer phase may also include a "stagein" where a plurality of nodes that are about to launch a program copy input data at the same time from the information processing apparatus 10.

When the number of connections added per unit time exceeds the first threshold, it is conceivable for the processing unit 13 to presume that a data transfer phase has occurred in a parallel processing system. In the data transfer phase, unless data transfer ends normally for all of the nodes, the data transfer phase as a whole will not be completed, which delays the completion of the job. Delays in the data transfer phase have a large effect on the time taken from the start to the completion of a job. When the total number of connections exceeds the second threshold when a data transfer phase has occurred, that is, when there are excessive connections, there is the risk that the addition of connections and data transmissions on the connections will be obstructed due to the insufficiency of memory regions at the information processing apparatus 10. For this reason, it is preferable to eliminate the number of excess connections produced by the data transfer phase as soon as possible.

On deciding to cut off existing connections, the processing unit 13 selects, based on the connection information 15, at least one connection out of the maintained connections preferentially in order from the oldest timing at which communication was last performed. As one example, assume that the selected number of connections is the difference between the current total number of connections and the second threshold. However, the number of connections selected in one operation may also be a predetermined number. When the connection information includes the connection list described above, the processing unit 13 may extract at least one entry of identification information in order from the connection list. As one example, the selected that differs to the job where the data transfer phase occurred.

The processing unit 13 causes the communication unit 11 to cut off the selected connections. The processing unit 13 is capable of releasing the memory regions corresponding to the connections that are cut off. As one example, assume that n connections including connections 14a, 14b, 14c are being maintained, which in order of the oldest timing at which communication was last carried out are the connection 14b, the connection 14a, and the connection 14c. In this example, the processing unit cuts off the connection 14b with the highest priority, and then cuts off the connection 14a with priority before cutting off the connection 14c.

Aside from determining to cut off connections based on the number of connections added per unit time, the information processing apparatus 10 may determine to cut off connections based on the idle time of each connection. In this configuration, connections that are maintained are connections for which the idle time is yet to reach a predetermined time. In this situation also, when the number of connections added per unit time exceeds a first threshold, a failure to respond to any excess in the number of connections risks delaying the data transfer phase of parallel processing. For this reason, it is preferable to cut off connections without waiting for the idle time to reach the predetermined time.

According to the information processing apparatus 10 according to the first embodiment, the number of connections being maintained and the timing at which each of the maintained connections last performed communication are monitored. When the added number of maintained connections per unit time exceeds the first threshold and the number of maintained connections exceeds the second threshold, at least one connection is selected with priority in order of the oldest timing at which communication was last performed. The selected at least one connection is then cut off. By doing so, it is possible to avoid delays in the data transfer phase of parallel processing due to insufficient memory regions at the information processing apparatus 10, and therefore possible to suppress a delay in the completion of a job that performs parallel processing.

Second Embodiment

Figure 2:
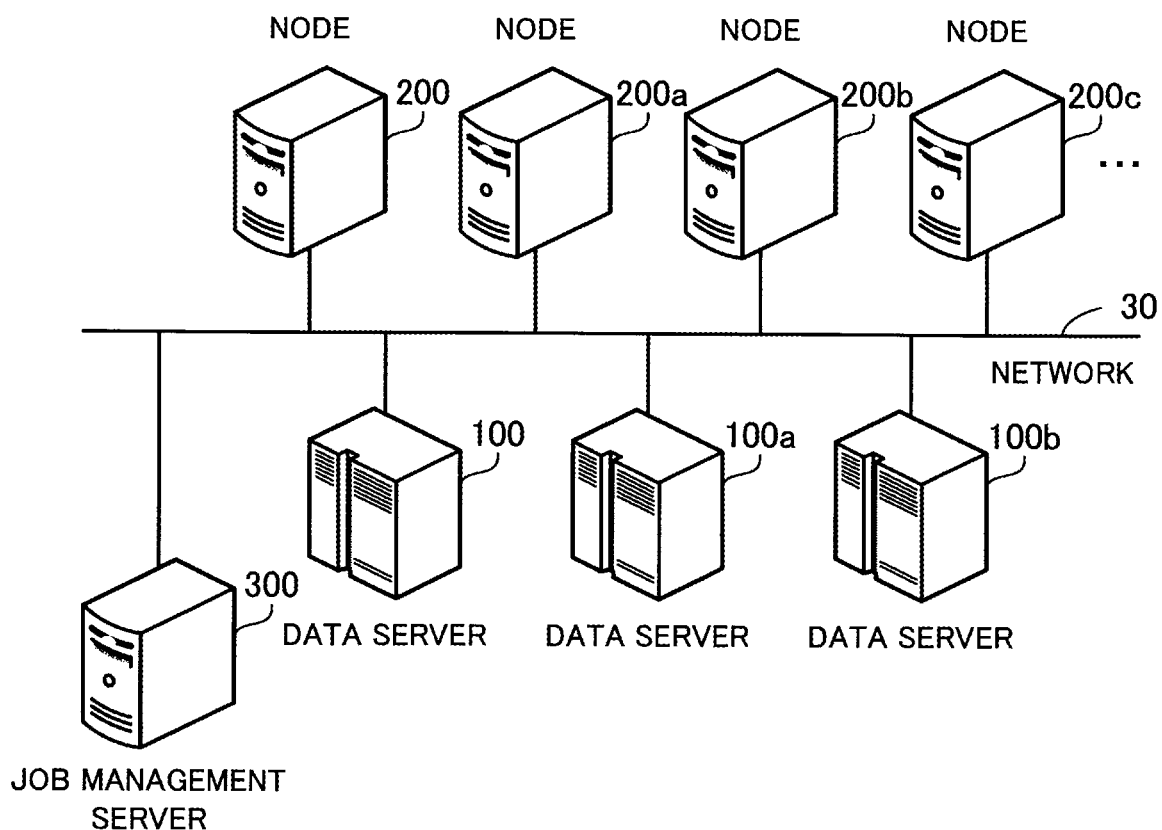
FIG. 2 depicts an example of a parallel processing system according to a second embodiment.

A second embodiment will now be described. FIG. 2 depicts an example of a parallel processing system according to the second embodiment.

The parallel processing system according to the second embodiment is capable of executing a program in parallel using a plurality of nodes. The parallel processing system includes a network 30, a plurality of data servers including data servers 100, 100a, and 100b, a plurality of nodes including nodes 200, 200a, 200b, and 200c, and a job management server 300.

The parallel processing system is disposed for example at an information processing facility such as a data center. The network 30 is a wired local network that performs data communication within the information processing facility, for example. The network 30 may include a LAN and/or InfiniBand. The plurality of data servers, the plurality of nodes, and the job management server 300 are each server computers and are connected to the network 30.

The data servers 100, 100a, and 100b store files relating to jobs that perform parallel processing using a non-volatile storage apparatus. Two or more data servers may form a common distributed file system. It is also possible for two or more files relating to a given job to be stored so as to be distributed between different data servers. The data servers 100, 100a, and 100b may store input files including input data to be read by the program of a given job. The data servers 100, 100a, and 100b may also store output files including result data outputted by the program of a given job. The data servers 100, 100a, and 100b may also store program files including programs to be executed by a given job.

As one example, the input files and program files are stored in the data servers 100, 100a, and 100b by a user in advance before the start of a job. Output files are stored by the nodes 200, 200a, 200b, and 200c in the data servers 100, 100a, and 100b when execution of a program ends and a job is completed, for example. After this, the output files may be read out by users.

The nodes 200, 200a, 200b, and 200c each include local computational resources, such as a CPU, RAM, and an HDD, with these local computational resources executing a program in parallel. The nodes used to execute a given job are assigned by the job management server 300. One job may be assigned to two or more nodes. The nodes 200, 200a, 200b, and 200c use the data servers 100, 100a, and 100b to store data. From the viewpoint of the data servers 100, 100a, and 100b, the nodes 200, 200a, 200b, and 200c may be referred to as "clients".

Before launching the program of a job, the nodes 200, 200a, 200b, and 200c may perform a "stagein" that collectively copies the input files from the data servers 100, 100a, and 100b into local storage, such as HDDs. By copying the input files before launching a program, it is possible to avoid communication during the execution of the program and thereby raise the execution efficiency of the program. Also, after the program of a job has ended, the nodes 200, 200a, 200b, and 200c may perform a "stageout" that collectively transfers output files from the local storage to the data servers 100, 100a, and 100b. The transferred output files may be deleted from the local storage. By doing so, it is possible to complete the job and release the assignment of nodes to the job.

Here, when staging, such as a stagein or stageout, occurs for a given job, a plurality of nodes that have been assigned to the job access one or more data servers at the same time. File transfers between the data servers 100, 100a, and 100b and the nodes 200, 200a, 200b, and 200c are performed by connection-oriented communication to ensure reliability. This means that when staging occurs, the number of connections maintained by the data servers 100, 100a, and 100b suddenly increases.

The job management server 300 manages the execution of jobs that use a plurality of nodes. The job management server 300 may receive job requests from terminal apparatuses (not illustrated) used by users. The job management server 300 performs scheduling of the received plurality of jobs and assigns nodes to each of the plurality of jobs.

A job request may be written in a job script file. A job script file may include a stagein command, a program launching command, a stageout command, and the like. A stagein command designates paths of input files. A program launching command designates a path of a program file. A stageout command designates paths of output files. As one example, the job management server 300 designates a stagein, a program launch, and a stageout to the nodes 200, 200a, 200b, and 200c in accordance with a job script file.

Figure 3:
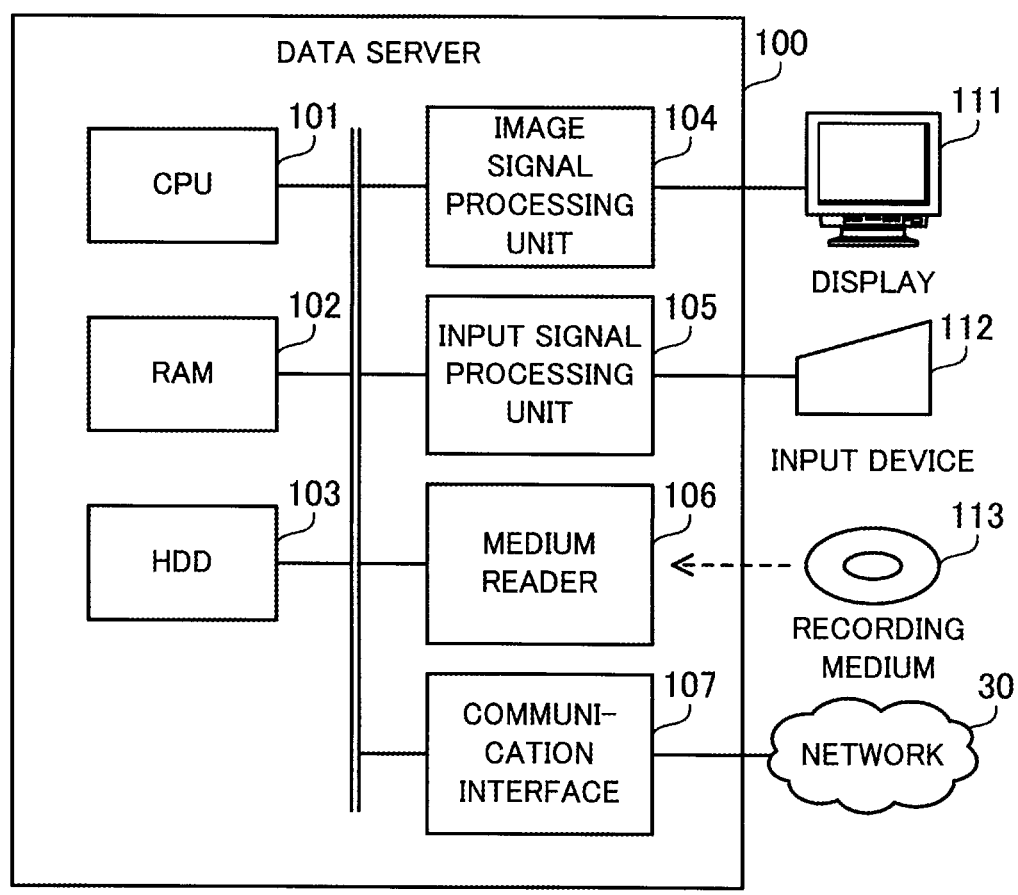
FIG. 3 is a block diagram depicting example hardware of a data server.

FIG. 3 is a block diagram depicting example hardware of a data server.

The data server 100 includes a CPU 101, RAM 102, an HDD 103, an image signal processing unit 104, an input signal processing unit 105, a medium reader 106, and a communication interface 107. The data servers 100a and 100b, the nodes 200, 200a, 200b, and 200c, and the job management server 300 may also be realized using the same hardware as the data server 100. Note that the CPU 101 corresponds to the processing unit 13 in the first embodiment, the RAM 102 or the HDD 103 corresponds to the storage unit 12 in the first embodiment, and the communication interface 107 corresponds to the communication unit 11 in the first embodiment.

The CPU 101 is a processor that executes instructions of a program. The CPU 101 loads at least part of a program and data stored in the HDD 103 into the RAM 102 and executes the program. Note that the CPU 101 may include a plurality of processor cores, the data server 100 may include a plurality of processors, and the processing described below may be executed in parallel by a plurality of processors or processor cores. A group composed of a plurality of processors may be referred to in this specification as a "multiprocessor" or simply as a "processor".

The RAM 102 is a volatile semiconductor memory that temporarily stores programs to be executed by the CPU 101 and data used in computation by the CPU 101. Note that the data server 100 may be equipped with memory of another type aside from RAM, and/or may be equipped with a plurality of memories.

The HDD 103 is a nonvolatile storage apparatus that stores an OS (Operating System), software programs such as middleware, and data. Note that the data server 100 may be equipped with other types of storage apparatus, such as flash memory and an SSD (Solid State Drive) and may be equipped with a plurality of nonvolatile storage apparatuses.

The image signal processing unit 104 outputs images to a display 111 connected to the data server 100 in accordance with instructions from the CPU 101. As the display 111, it is possible to use a CRT (Cathode Ray Tube) display, an LCD (Liquid Crystal Display), a plasma display, an organic EL (Electro-Luminescence) display, or any other type of display.

The input signal processing unit 105 acquires an input signal from an input device 112 connected to the data server 100 and outputs to the CPU 101. As the input device 112, it is possible to use a pointing device, such as a mouse, a touch panel, a touch pad, or a trackball, a keyboard, a remote controller, button switches, or the like. It is also possible to connect a plurality of types of input device to the data server 100.

The medium reader 106 is a reader apparatus that reads programs and data recorded on a recording medium 113. As examples of the recording medium 113, it is possible to use a magnetic disk, an optical disk, a magneto-optical (MO) disc, or a semiconductor memory. Examples of magnetic disks include flexible disks (FD) and HDD. Examples of optical discs include CD (Compact Disc) and DVD (Digital Versatile Disc).

As one example, the medium reader 106 copies programs and data read out from the recording medium 113 into another recording medium, such as the RAM 102 or the HDD 103. A program that has been read out is executed by the CPU 101, for example. Note that the recording medium 113 may be a portable recording medium and may be used to distribute programs and data. Also, the recording medium 113 and/or the HDD 103 may be referred to as "computer-readable recording media".

The communication interface 107 is an interface that is connected to the network 30 and communicates via the network 30 with the nodes 200, 200a, 200b, and 200c. The communication interface 107 is connected by cables to communication apparatuses, such as switches and routers.

Figure 4:
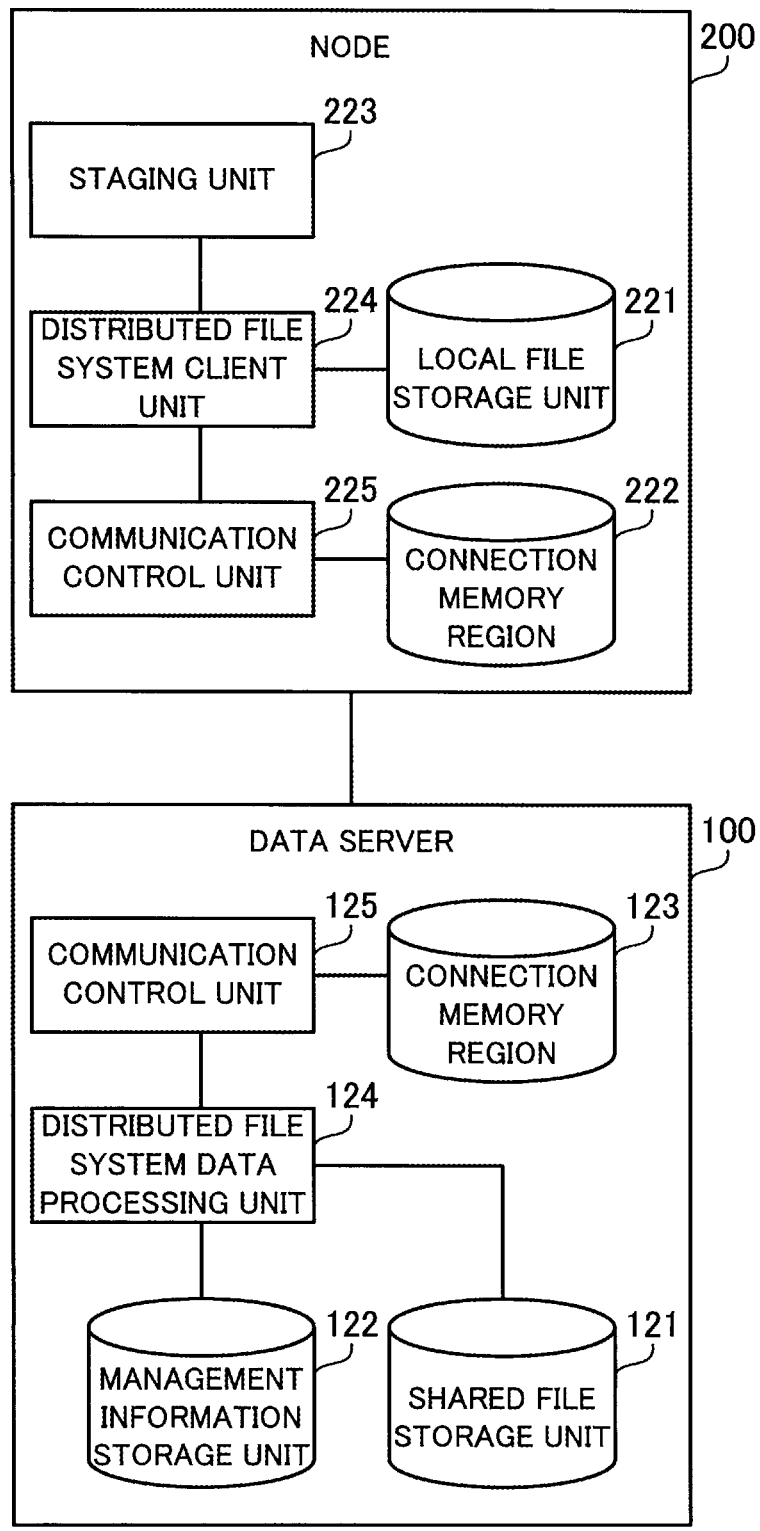
FIG. 4 is a block diagram depicting example software of a node and a data server.

FIG. 4 is a block diagram depicting example software of the node and the data server.

The data server 100 includes a shared file storage unit 121, a management information storage unit 122, a connection memory region 123, a distributed file system data processing unit 124, and a communication control unit 125. The shared file storage unit 121 is implemented using the HDD 103, for example. The management information storage unit 122 is implemented using the RAM 102 or the HDD 103, for example. The connection memory region 123 is implemented using the RAM 102, for example. The distributed file system data processing unit 124 is implemented for example using a middleware program executed by the CPU 101. The communication control unit 125 is implemented for example by a device driver executed by the CPU 101. Other data servers, such as the data servers 100a and 100b may be realized using the same units as the data server 100.

The shared file storage unit 121 stores files to be managed based on a directory system of the distributed file system. The files stored in the shared file storage unit 121 are identified by file paths in the distributed file system. The shared file storage unit 121 may store one or more input files to be used by a plurality of nodes assigned to a job and a plurality of output files generated by the plurality of nodes.

The management information storage unit 122 stores management information to be used in management of connections established between the plurality of nodes. As described later, during a stagein or a stageout of a given job, the data server 100 may establish a plurality of new connections at the same time in response to requests from the plurality of nodes to be used for the job. At this time, the data server 100 may refer to the management information and cut off existing old connections.

The connection memory region 123 includes memory regions assigned to the respective connections maintained by the data server 100. The memory region corresponding to a given connection includes a reception buffer that temporarily holds messages received using that connection. The memory region corresponding to a given connection also includes a transmission buffer that temporarily holds messages to be transmitted using that connection. The memory region also stores various information, such as sequence numbers to be used when managing the order of messages.

The distributed file system data processing unit 124 processes file access requests. In response to a read request including a file path, the distributed file system data processing unit 124 reads the file data indicated by the file path from the shared file storage unit 121 and sends the read out file data in reply as a file access result. Also, in response to a write request including a file path and file data, the distributed file system data processing unit 124 writes the file data in accordance with the file path in the shared file storage unit 121. The distributed file system data processing unit 124 also transmits a write result indicating whether the write was successful in reply as a file access result.

The distributed file system data processing unit 124 monitors the establishment of new connections and the reception of file access requests that use the connections, and updates the management information stored in the management information storage unit 122. Based on the management information, the distributed file system data processing unit 124 determines whether the number of connections maintained by the data server 100 satisfies a predetermined condition, and, when the predetermined condition is satisfied, instructs the communication control unit 125 to cut off old connections. The trigger for cutting off connections and the selecting of connections to be cut off will be described later.

The communication control unit 125 controls connection-oriented communication between the data server 100 and a plurality of nodes. On receiving a connection establishment request from a given node, the communication control unit 125 reserves a memory region corresponding to the new connection in the connection memory region 123 and sends a connection establishment response in reply. The communication control unit 125 also assigns a connection identifier to the new connection and notifies the distributed file system data processing unit 124 of the connection identifier so that communication is thereafter performed using the new connection.

When a file access request has arrived at the reception buffer of a given connection, the communication control unit 125 performs control so that the distributed file system data processing unit 124 is capable of processing the file access request. Also, when the distributed file system data processing unit 124 has generated a file access result for a given connection, the communication control unit 125 performs control so that the file access result is transmitted from the transmission buffer for that connection.

On receiving a connection cutoff request that designates a connection identifier from the distributed file system data processing unit 124, the communication control unit 125 transmits a connection cutoff request to a peer node on the connection indicated by the connection identifier. On receiving a connection cutoff response from the peer node, the communication control unit 125 releases the memory region corresponding to that connection from the connection memory region 123. Also, when a connection cutoff response has not been received within a certain time from the transmission of a connection cutoff request, the communication control unit 125 may regard the connection as having been cut off and release the memory region. Note that the transferring of the connection establishment request, the connection establishment response, the connection cutoff request, and the connection cutoff response is performed for example by so-called "connectionless communication".

The node 200 includes a local file storage unit 221, a connection memory region 222, a staging unit 223, a distributed file system client unit 224, and a communication control unit 225. The local file storage unit 221 is implemented using RAM or an HDD, for example. The connection memory region 222 is implemented using RAM, for example. The staging unit 223 and the distributed file system client unit 224 are implemented using a middleware program executed by a CPU, for example. The communication control unit 225 is implemented using a device driver executed by the CPU, for example. The other nodes, such as the nodes 200a, 200b, and 200c, may be realized using the same units as the node 200.

The local file storage unit 221 stores copies of program files and copies of input files. The input files are copied from the data servers 100, 100a, and 100b by a stagein. The input files stored in the local file storage unit 221 are used as inputs for programs. The local file storage unit 221 also stores output files generated by programs. The output files are transferred to the data servers 100, 100a, and 100b by a stageout. After a job is completed, files related to the job are deleted from the local file storage unit 221.

The connection memory region 222 includes memory regions that are assigned to the connections maintained by the node 200. The memory region for each connection includes a reception buffer and a transmission buffer and stores various information, such as sequence numbers. The connections maintained by the node 200 are mainly connections with the data servers 100, 100a, and 100b, and are a suitably low number of connections compared to the connections maintained by the data server 100.

The staging unit 223 performs staging including a stagein and a stageout in response to an instruction from the job management server 300. During a stagein, the staging unit 223 designates a path of an input file to the distributed file system client unit 224 so that the input file is copied into the local file storage unit 221. During a stageout, the staging unit 223 designates a path of an output file to the distributed file system client unit 224 so that an output file stored in the local file storage unit 221 is transferred.

The distributed file system client unit 224 generates a file access request for the distributed file system. During a stagein, the distributed file system client unit 224 generates a read request including a file path designated from the staging unit 223 and stores input file data included in the file access result for the read request in the local file storage unit 221. During a stageout, the distributed file system client unit 224 generates a write request including a file path designated from the staging unit 223 and output file data stored in the local file storage unit 221.

The distributed file system client unit 224 knows the communication addresses (for example, IP (Internet Protocol) addresses) of the data servers 100, 100a, and 100b in advance. When issuing a file access request for a data server for which a connection does not exist, the distributed file system client unit 224 designates the communication address of the intended data server and provides the communication control unit 225 with a connection establishment request. When establishment of a connection has succeeded, the communication control unit 225 notifies the distributed file system client unit 224 of the connection identifier. The distributed file system client unit 224 then issues a file access request using the connection identifier corresponding to the intended data server.

The communication control unit 225 controls connection-oriented communication between the node 200 and one or more data servers. On acquiring a connection establishment request from the distributed file system client unit 224, the communication control unit 225 reserves a memory region corresponding to the new connection in the connection memory region 222. The communication control unit 225 transmits the connection establishment request to the communication address designated by the distributed file system client unit 224. When a connection establishment response has been received, the communication control unit 225 assigns a connection identifier to the new connection and notifies the distributed file system client unit 224 of the connection identifier. Note that so long as the connection identifiers assigned here are unique at the node 200, the identifiers may differ to the connection identifiers assigned as described above at the destination data server.

Also, when the distributed file system client unit 224 has generated a file access request for a given connection, the communication control unit 225 performs control so that a file access request is transmitted from the transmission buffer for that connection. When a file access result has arrived at the reception buffer of a given connection, the communication control unit 225 performs control so that the distributed file system client unit 224 becomes capable of processing the file access result.

When a connection cutoff request has been received for a given connection, the communication control unit 225 releases the memory region corresponding to that connection from the connection memory region 222 and transmits a connection cutoff response to the peer data server in reply.

Figure 5:
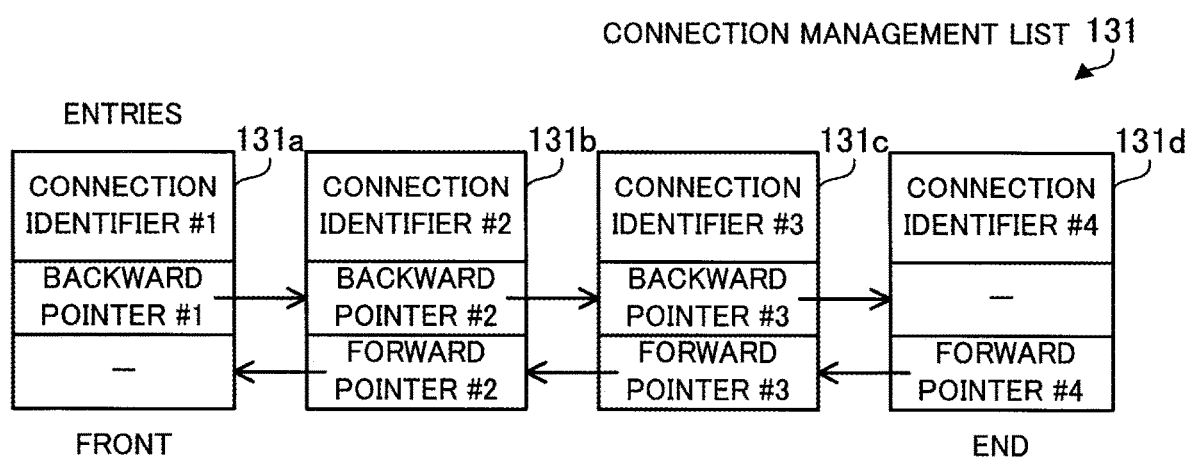
FIG. 5 depicts an example of a connection management list.

FIG. 5 depicts an example of a connection management list.

A connection management list 131 is stored in the management information storage unit 122 of the data server 100. The connection management list 131 is a connection list in which a plurality of entries are connected by pointers. Each entry includes a connection identifier, a forward pointer that designates the preceding entry, and a backward pointer that designates the following entry. The forward pointer of the entry at the front is NULL (empty) and the backward pointer of the entry at the end is also NULL.

When four connections are being maintained, the connection management list 131 includes entries 131a, 131b, 131c, and 131d. The entry 131a is the first entry and has entry identifier #1 and backward pointer #1 that designates the entry 131b. The entry 131b is the second entry from the front and has entry identifier #2, backward pointer #2 that designates the entry 131c, and forward pointer #2 that designates the entry 131a. The entry 131c is the third entry from the front and has an entry identifier #3, backward pointer #3 that designates the entry 131d, and forward pointer #3 that designates the entry 131b. The entry 131d is the final entry and has entry identifier #4 and forward pointer #2 that designates the entry 131c.

The plurality of entries included in the connection management list 131 are the connections arranged into order of "oldest" from the front to the end. The expression "oldest" here refers to the oldest time at which a file access request was last transmitted, and corresponds to the longest idle time. The entry at the front of the connection management list 131 is the oldest connection out of the connections being maintained. The oldest connection is the connection with the oldest time at which a file access request was last transmitted, which is to say the longest idle time, and may also be referred to as the LRU (Least Recently Used) connection. The connection indicated by the entry at the end of the connection management list 131 is the "newest" connection out of the connections being maintained. Here, the expression "newest connection" refers to the connection that was used to transmit a file access request most recently, which is therefore the connection with the shortest idle time.

The order of the plurality of entries in the connection management list 131 is managed in accordance with an LRU algorithm. When a new connection is established, an entry corresponding to that connection is added to the end of the connection management list 131. When a file access request is transmitted on a given connection, the entry corresponding to that connection is moved to the end of the connection management list 131. At this time, the pointers of the moved entry and the preceding and succeeding entries are rewritten. As one example, when the entry 131*b* is moved to the end, the backward pointer of the entry 131*b* is changed to become NULL and the forward pointer of the entry 131*b* is changed so as to indicate the entry 131*d*. The backward pointer of the entry 131*a* is changed to indicate the entry 131*c* and the forward pointer of the entry 131*c* is changed to indicate the entry 131*a*.

FIG. 6 depicts one example of a connection number table.

A connection number table 132 is stored in the management information storage unit 122 of the data server 100. The connection number table 132 includes "present number of connections", "previous number of connections", "rate of increase", "rate of increase threshold", "total number threshold", and "number of excess connections" rows.

The "present number of connections" is the most recent value of the number of connections being maintained by the data server 100. An amount of memory proportional to the present number of connections will be consumed to maintain these connections. When new connections are established, the number of newly established connections is added to the present number of connections. When existing connections are cut off, the number of newly cutoff connections is subtracted from the present number of connections.

The "previous number of connections" is the value of the "present number of connections" at a preceding execution of a connection cutoff judgment. A connection cutoff judgment is a judgment of whether to cut off some of the connections being maintained, and is executed at intervals of a predetermined period (for example, every second). Whenever the connection cutoff judgment is performed, the present number of connections is saved as the previous number of connections. During the predetermined period following a connection cutoff judgment, the present number of connections will change from the previous number of connections.

The "rate of increase" is the number of connections added in the predetermined period. A value produced by subtracting the previous number of connections from the present number of connections, that is, a value produced by subtracting the number of connections when the preceding connection cutoff judgment was performed from the number of connections when a present connection cutoff judgment is being performed is calculated as the rate of increase. However, when the value produced by subtracting the previous number of connections from the present number of connections is below zero, the "rate of increase" is set at zero. The "rate of increase threshold" is a threshold for comparing with the rate of increase, and is set in advance by the administrator of the data server 100. As one example, the rate of increase threshold is set at around several hundred. When the rate of increase exceeds the rate of increase threshold, it is presumed that the number of connections has suddenly increased due to staging, such as a stagein or a stageout.

The "total number threshold" is a threshold for comparing with the present number of connections and is designated in advance by the administrator of the data server 100. As one example, the total number threshold is set at around several thousand to several tens of thousands of connections. When the present number of connections exceeds the total number threshold, it is presumed that there is the risk of connection establishment being rejected due to an insufficiency of memory regions. The "number of excess connections" is the excess in the number of connections over the total number threshold and is calculated by subtracting the total number threshold from the present number of connections. However, when the value produced by subtracting the total number threshold from the present number of connections is below zero, the number of excess connections is set at zero.

When the memory regions are insufficient at the data server 100 during execution of staging by a given job, there is the risk that some of the nodes that belong to that job will wait for connections to be established, which may delay the completion of staging. In particular, when the completion of a stageout is delayed, it will not be possible to release nodes in spite of the execution of the program having ended, which also affects the schedule of other jobs. For this reason, when both the rate of increase exceeds the rate of increase threshold and the present number of connections exceeds the total number threshold, the data server 100 attempts to rapidly eliminate the excess in the number of connections. At this time, the data server 100 cuts off a number of old connections equal to the excess in the number of connections.

Note that separately to the connection cutoff judgment described later, the data server 100 may automatically cut off connections whose idle time exceeds a predetermined time (for example, around several tens of minutes). In this case, the present number of connections written in the connection number table 132 is the number of connections for which the idle time does not exceed this predetermined time. Here also, to avoid delays in the completion of staging, the data server 100 cuts off relatively old connections without waiting for the idle time to exceed the predetermined time. Connections that are cut off before the idle time exceeds the predetermined time are connections where there is actually the possibility of the peer node performing communication once again. When this happens, the affected peer nodes again transmit a connection establishment request to the data server 100. By operating in this way, whenever staging occurs, priority is given to rapidly completing the staging.

The cutting off of connections whose idle time exceeds the predetermined time may be performed by the distributed file system data processing unit 124. The time at which communication was last performed on each connection or the length of time that has passed since such communication may be included in the management information stored in the management information storage unit 122.

Figure 7:
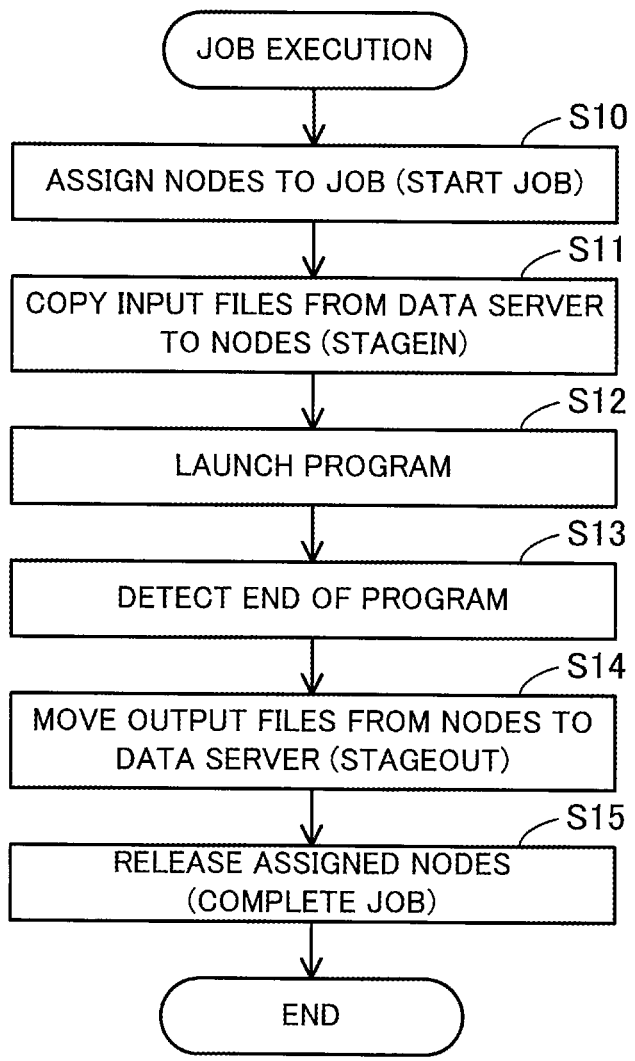
FIG. 7 is a flowchart depicting an example procedure of a job execution.

Next, the processing procedure of the parallel processing system will be described. FIG. 7 is a flowchart depicting an example procedure of a job execution.

(S10) The job management server 300 selects at least one free node from the nodes in the parallel processing system, assigns the selected nodes to a job, and starts the job.

(S11) The job management server 300 causes each assigned node to execute a stagein in accordance with a job script file or the like. Each node copies an input file from at least one data server into local storage at the node. However, depending on the job, when an input file does not exist, no stagein may be executed.

(S12) The job management server 300 causes each assigned node to launch a program in accordance with a job script file or the like. Each node launches a program.

(S13) Each node ends execution of the program. The job management server 300 detects that all of the nodes assigned to a job have finished executing the program.

(S14) The job management server 300 causes each assigned node to execute a stageout in accordance with a job script file or the like. Each node moves an output file from the local storage to one or more data servers.

(S15) The job management server 300 releases the nodes assigned to the job. By doing so, the job is completed and the released nodes become free nodes.

Figure 8:
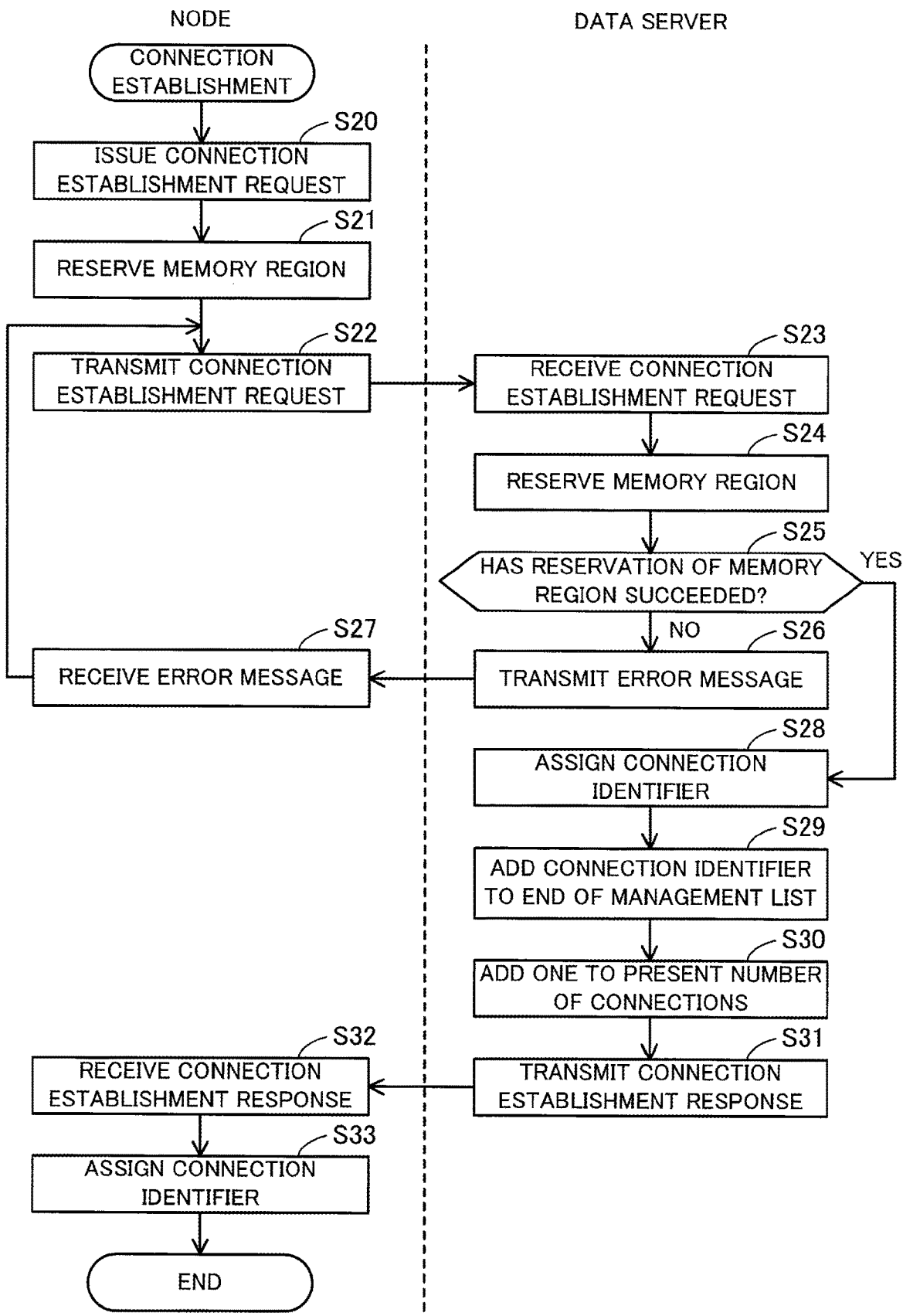
FIG. 8 is a flowchart depicting an example procedure of a connection establishment.

FIG. 8 is a flowchart depicting an example procedure for connection establishment. Connection establishment may be performed by each node at the start of a stagein or a stageout. Here, consider a case where the node 200 connects to the data server 100.

(S20) The distributed file system client unit 224 designates a communication address of the data server 100 and issues a connection establishment request to the communication control unit 225.

(S21) The communication control unit 225 reserves a memory region corresponding to a new connection in the connection memory region 222 (i.e., in the RAM).

(S22) The communication control unit 225 transmits a connection establishment request to the data server 100. As one example, the connection establishment request is transmitted by connectionless communication.

(S23) The communication control unit 125 receives the connection establishment request.

(S24) The communication control unit 125 reserves a memory region corresponding to the new connection in the connection memory region 123 (i.e., in the RAM 102).

(S25) The communication control unit 125 determines whether reserving of a memory region in step S24 succeeded. When the reserving of a memory region succeeded, the processing advances to step S28. When the reserving of a memory region failed, due to insufficient memory regions or the like, the processing advances to step S26.

(S26) The communication control unit 125 transmits an error message to the node 200.

(S27) The communication control unit 225 receives the error message. The processing then proceeds to step S22. The communication control unit 225 may wait a certain time and then resend a connection establishment request to the data server 100. Alternatively, the communication control unit 225 may notify the distributed file system client unit 224 of an error and the distributed file system client unit 224 may wait a certain time and then reissue a connection establishment request to the communication control unit 225.

(S28) The communication control unit 125 assigns a connection identifier to the new connection. It is sufficient for the connection identifier to be unique at the data server 100, which means that the connection identifier may be decided independently of the node 200. The communication control unit 125 notifies the distributed file system data processing unit 124 of the assigned connection identifier.

(S29) The distributed file system data processing unit 124 generates an entry including the connection identifier indicated by the communication control unit 125 and adds the generated entry to the end of the connection management list 131 stored in the management information storage unit 122.

(S30) The distributed file system data processing unit 124 increases the present number of connections in the connection number table 132 stored in the management information storage unit 122 by one.

(S31) The communication control unit 125 transmits a connection establishment response to the node 200. This connection establishment response is transmitted by connectionless communication, for example. The updating of the connection management list 131 and the connection number table 132 in steps S29 and S30 and the transmission of the connection establishment response may be asynchronously executed.

(S32) The communication control unit 225 receives the connection establishment response.

(S33) The communication control unit 225 assigns a connection identifier to the new connection. It is sufficient for this connection identifier to be unique at the node 200, which means that the connection identifier may be decided independently of the data server 100. The communication control unit 225 notifies the distributed file system client unit 224 of the assigned connection identifier.

Figure 9:
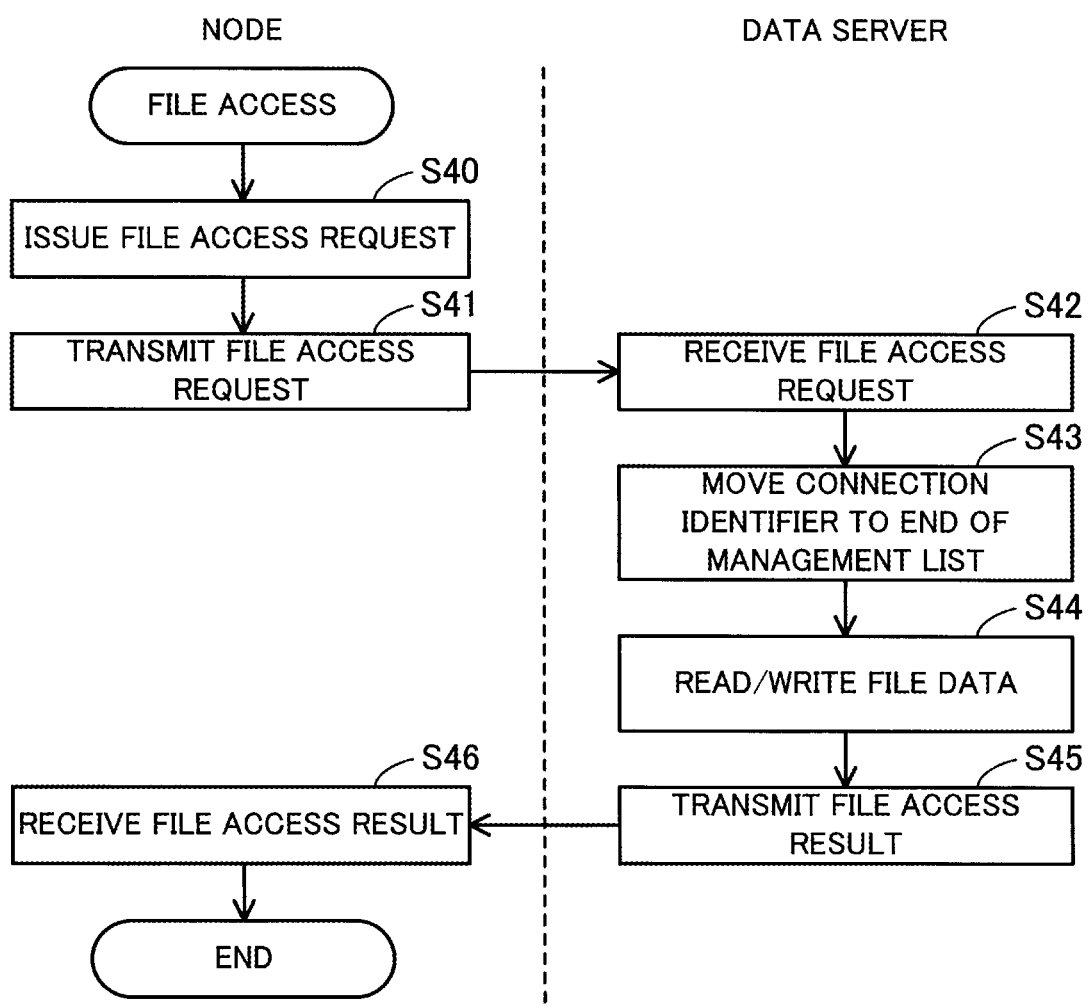
FIG. 9 is a flowchart depicting an example procedure of a file access.

FIG. 9 is a flowchart depicting an example procedure of a file access. A file access may be executed by each node during a stagein or a stageout. Here, consider a case where the node 200 accesses the data server 100.

(S40) The distributed file system client unit 224 designates a connection identifier and issues a file access request indicating a read request or a write request.

(S41) The communication control unit 225 uses the connection indicated by the designated connection identifier to transmit the file access request to the data server 100.

(S42) The communication control unit 125 receives the file access request. The communication control unit 125 notifies the distributed file system data processing unit 124 of the file access request and the connection identifier indicating the connection on which the file access request was received.

(S43) The distributed file system data processing unit 124 searches the connection management list 131 stored in the management information storage unit 122 for an entry including the indicated connection identifier and moves the found entry to the end of the connection management list 131.

(S44) The distributed file system data processing unit 124 executes a file access process corresponding to the file access request. When the file access request is a read request, the distributed file system data processing unit 124 reads the requested file data from the shared file storage unit 121 and generates a file access result including the read file data. When the file access request is a write request, the distributed file system data processing unit 124 writes the file data included in the write request into the shared file storage unit 121 and generates a file access result indicating whether the write succeeded. The distributed file system data processing unit 124 designates the connection identifier that was designated in the file access request and outputs a file access result.

(S45) The communication control unit 125 uses the connection indicated by the designated identifier to transmit the file access result to the node 200.

(S46) The communication control unit 225 receives the file access result. The communication control unit 225 notifies the distributed file system client unit 224 of the file access result and the connection identifier indicating the connection on which the file access result was received.

Figure 10:
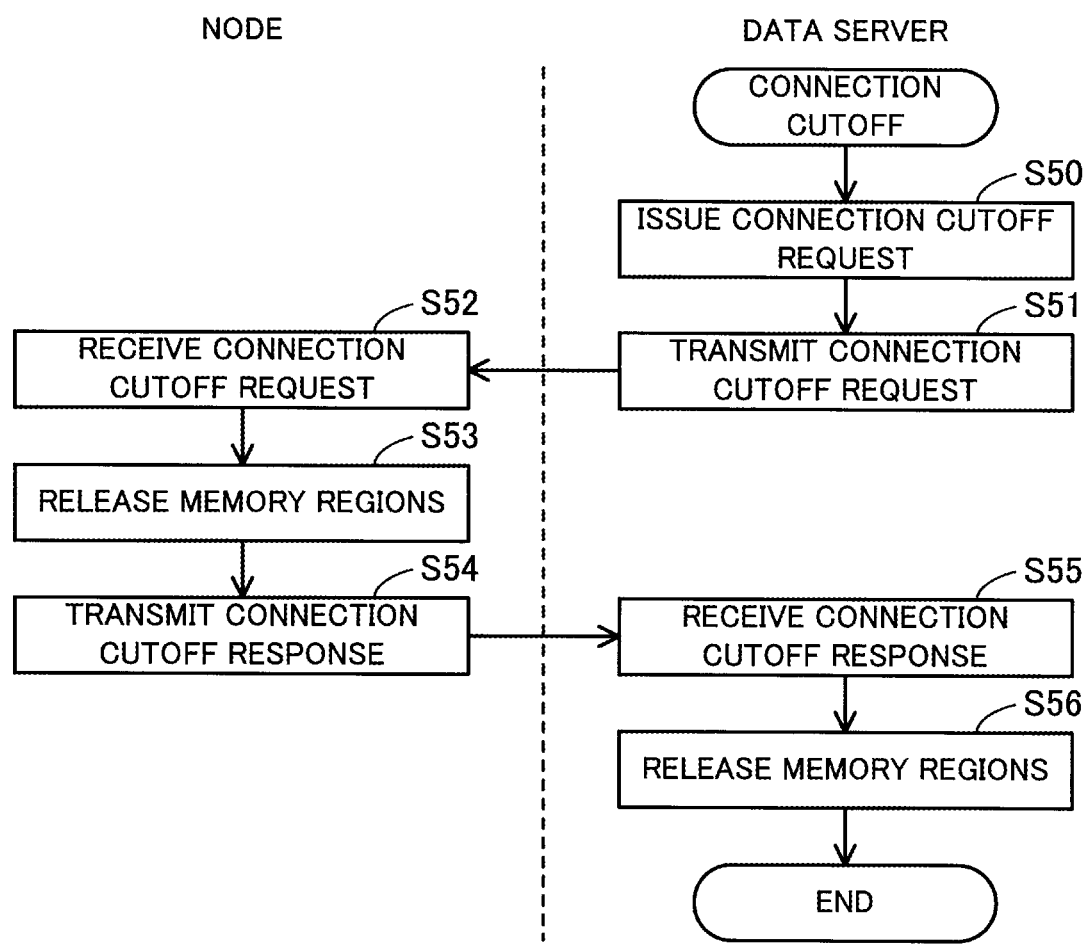
FIG. 10 is a flowchart depicting an example procedure of a connection cutoff.

FIG. 10 is a flowchart depicting an example procedure of a connection cutoff. Connection cutoffs are executed as appropriate based on judgments made on the data server side. Here, consider when the data server 100 cuts off a connection with the data server 100.

(S50) The distributed file system data processing unit 124 selects the connections to be cut off. The distributed file system data processing unit 124 designates connection identifiers of the selected connections and issues a connection cutoff request to the communication control unit 125. Note that the connection cutoff judgment including selection of connections to be cut off is regularly executed by the distributed file system data processing unit 124. The connection cutoff judgment is described later.

(S51) The communication control unit 125 transmits a connection cutoff request to the node 200. The connection cutoff request is transmitted using connectionless communication, for example.

(S52) The communication control unit 225 receives the connection cutoff request.

(S53) The communication control unit 225 releases the memory regions corresponding to the connections to be cut off from the connection memory region 222 (RAM).

(S54) The communication control unit 225 transmits a connection cutoff response to the data server 100. The connection cutoff response is transmitted using connectionless communication, for example.

(S55) The communication control unit 125 receives the connection cutoff response.

(S56) The communication control unit 125 releases the memory regions corresponding to the connections to be cut off from the connection memory region 123 (the RAM 102).

Figure 11:
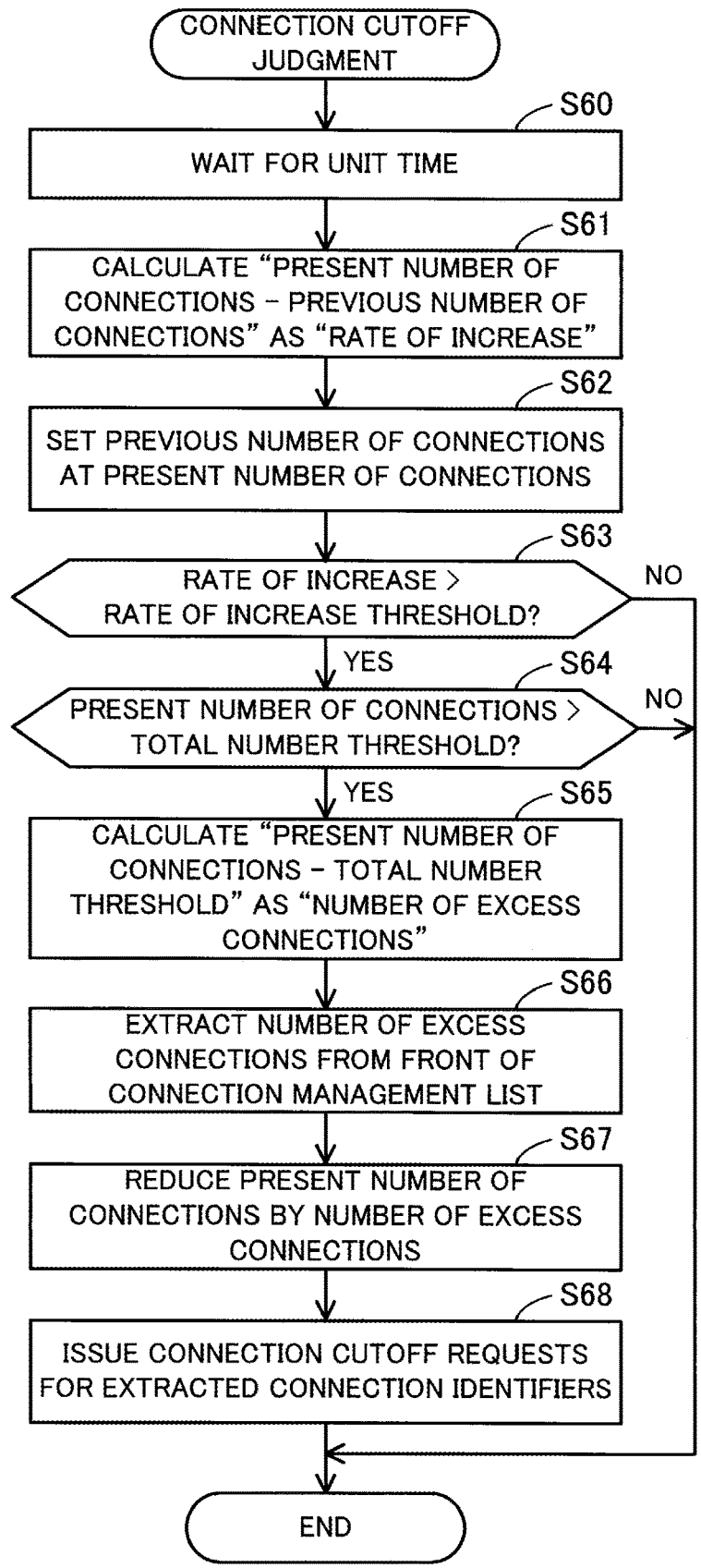
FIG. 11 is a flowchart depicting an example procedure of a connection cutoff judgment.

FIG. 11 is a flowchart depicting an example procedure of a connection cutoff judgment. The connection cutoff judgment is repeatedly executed by the distributed file system data processing unit 124.

(S60) The distributed file system data processing unit 124 waits for a unit time (for example, one second).

(S61) The distributed file system data processing unit 124 reads out the present number of connections and the previous number of connections from the connection number table 132 stored in the management information storage unit 122. The distributed file system data processing unit 124 performs the calculation "rate of increase=present number of connections the previous number of connections" and records the calculated rate of increase in the connection number table 132. However, when subtracting the previous number of connections from the present number of connections produces a minus value, the rate of increase is set at zero.

(S62) The distributed file system data processing unit 124 copies the present number of connections recorded in the connection number table 132 into the previous number of connections row.

(S63) The distributed file system data processing unit 124 reads out the rate of increase threshold from the connection number table 132 and compares the rate of increase calculated in step S61 with the rate of increase threshold. When the rate of increase exceeds the rate of increase threshold, the distributed file system data processing unit 124 presumes that staging has started for one or more jobs and the processing advances to step S64. When the rate of increase is equal to or below the rate of increase threshold, the present connection cutoff judgment ends.

(S64) The distributed file system data processing unit 124 reads out the total number threshold from the connection number table 132 and compares the present number of connections with the total number threshold. When the present number of connections exceeds the total number threshold, the distributed file system data processing unit 124 determines that there is a risk of an insufficiency of memory regions due to an excessive number of connections, and the processing advances to step S65. When the present number of connections is equal to or below the total number threshold, the present connection cutoff judgment ends.

(S65) The distributed file system data processing unit 124 performs the calculation "number of excess connections=present number of connections−total number threshold" and records the calculated number of excess connections in the connection number table 132.

(S66) The distributed file system data processing unit 124 extracts a number of connection identifiers equal to the number of excess connections in order from the front of the connection management list 131 stored in the management information storage unit 122, that is, in order of the oldest time at which communication was last performed. Entries including the extracted connection identifiers may be deleted from the connection management list 131.

(S67) The distributed file system data processing unit 124 reduces the present number of connections recorded in the connection number table 132 by the number of excess connections.

(S68) The distributed file system data processing unit 124 issues a connection cutoff request for each of the connection identifiers extracted in step S66. The connection cutoff process depicted in FIG. 10 is then executed for each of the issued connection cutoff requests.

With the parallel processing system according to the second embodiment, the present number of connections of a data server and the relative lengths of time since communication was last performed on the respective connections are managed. When the rate of increase in the number of connections has exceeded a threshold, it is presumed that staging, such as a stagein or a stageout, has started for one or more jobs. When the number of connections for a data server is excessive when staging has started, the excess in the number of connections is eliminated by cutting off connections with priority given to connections with the oldest times at which communication was last performed. By doing so, it is possible to prevent nodes that perform staging from failing to establish a connection due to insufficient memory regions at a data server. Accordingly, it is possible to avoid delays in the staging of jobs and to thereby avoid delays in the completion of jobs.

According to the above embodiments, it is possible to avoid delays to a data transfer phase during parallel processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a communication interface capable of adding a connection in response to a request from another information processing apparatus;
a memory that stores connection information indicating a number of connections being maintained and timing at which communication was last performed for each of the maintained connections; and
a processor that calculates an increase rate of the number of maintained connections per unit time, selects, when the increase rate exceeds an increase rate threshold and the number of maintained connections exceeds a total number threshold, at least one connection out of the maintained connections in order from oldest timing, based on the connection information, and cuts off the selected at least one connection.

2. The information processing apparatus according to claim 1, wherein the connection information includes list information in which identification information of the maintained connections is written in order of the timing at which communication was last performed.

3. The information processing apparatus according to claim 1, wherein the processor selects, as the at least one connection, a number of connections equal to a difference between the number of maintained connections and the total number threshold.

4. A memory control method comprising:
- monitoring, by a processor included in an information processing apparatus, a number of connections being maintained by the information processing apparatus and timing at which communication was last performed for each of the maintained connections;
- calculating, by the processor, an increase rate of the number of maintained connections per unit time;
- selecting, by the processor, when the increase rate exceeds an increase rate threshold and the number of maintained connections exceeds a total number threshold, at least one connection out of the maintained connections in order from oldest timing; and
- cutting off, by the processor, the selected at least one connection.

5. A non-transitory computer-readable storage medium storing a computer program that causes a computer to perform a procedure comprising:
- monitoring a number of connections being maintained by the computer and timing at which communication was last performed for each of the maintained connections;
- calculating an increase rate of the number of maintained connections per unit time;
- selecting, when the increase rate exceeds an increase rate threshold and the number of maintained connections exceeds a total number threshold, at least one connection out of the maintained connections in order from oldest timing; and
- cutting off the selected at least one connection.

* * * * *